(12) United States Patent
Shrake (10) Patent No.: US 9,799,230 B2
(45) Date of Patent: Oct. 24, 2017

(54) CREATING WORKOUT ROUTINE AND NUTRITIONAL CHOICES IN AN ONLINE ENVIRONMENT

(71) Applicant: Anne Shrake, Windermere, FL (US)

(72) Inventor: Anne Shrake, Windermere, FL (US)

(73) Assignee: GlobalMe, LLC, Winter Garden, FL (US)

( * ) Notice: Subject to any disclaimer, the term of this patent is extended or adjusted under 35 U.S.C. 154(b) by 494 days.

(21) Appl. No.: 14/067,624

(22) Filed: Oct. 30, 2013

(65) Prior Publication Data

US 2015/0118656 A1 Apr. 30, 2015
US 2016/0253921 A9 Sep. 1, 2016

Related U.S. Application Data

(60) Provisional application No. 61/710,194, filed on Oct. 5, 2012.

(51) Int. Cl.
G09B 19/00 (2006.01)

(52) U.S. Cl.
CPC ....... *G09B 19/0092* (2013.01); *G09B 19/003* (2013.01)

(58) Field of Classification Search
CPC ..................... G09B 19/0092; G09B 19/003
USPC ................................................ 434/127, 247
See application file for complete search history.

(56) References Cited

U.S. PATENT DOCUMENTS

| | | | | |
|---|---|---|---|---|
| 7,641,592 B2* | 1/2010 | Roche | ............. | A63B 22/00 434/247 |
| 7,959,567 B2* | 6/2011 | Stivoric | ............. | A61B 5/411 128/921 |
| 2003/0091964 A1* | 5/2003 | Yeager | ............. | G06F 19/324 434/127 |
| 2012/0094258 A1* | 4/2012 | Langheier | ............. | G06F 19/3406 434/127 |
| 2013/0123667 A1* | 5/2013 | Komatireddy | ............. | A61B 5/0002 600/595 |
| 2014/0272855 A1* | 9/2014 | Maser | ............. | G11B 27/031 434/247 |
| 2015/0093725 A1* | 4/2015 | Baarman | ............. | G06F 19/3475 434/127 |

* cited by examiner

*Primary Examiner* — Kesha Frisby
(74) *Attorney, Agent, or Firm* — Fish & Richardson P.C.

(57) ABSTRACT

A system for creating user-defined workout routine and one or more nutritional choices in an online environment is provided. The system may include a processor configured to receive, from a user, data associated with one or more user personal metrics, based on which the user may be provided with a plurality of workout video segments for selection. The system may then combine the user-selected workout video segments into a single customized workout video. The system may further compile one or more nutritional choices based on the one more user personal metrics. The nutritional choices may be associated with the user video selection and may include meals that meet a user nutritional goal.

25 Claims, 9 Drawing Sheets

CREATING WORKOUT ROUTINE AND NUTRITIONAL CHOICES IN AN ONLINE ENVIRONMENT

CROSS-REFERENCE TO RELATED APPLICATIONS

The applications claims priority to U.S. Provisional Applications Ser. No. 61/710,194, filed on Oct. 5, 2012.

TECHNICAL FIELD

This application relates generally to data processing, and, more specifically, to generating a user-defined workout routine and one or more nutritional choices in an online environment.

BACKGROUND

Health and medical experts stress the importance of exercising on a regular basis to maintain healthy lifestyle. To this end, virtually every city has some type of gym or health club facility, which offers a multitude of in-person health and fitness programs.

Despite the availability of these facilities, there are many reasons why an individual would rather exercise in a private setting, such as home or office, for example. Several of the most common reasons include: transportation to or from a gym, financial obligations resulting from generally high membership and activity fees, intimidation from other gym members, and the requirement to conform to a rigorous and impersonal routine when attending a gym class, which is designed to be a "one size fits all" approach.

For each of these reasons, home gyms have become increasingly popular in recent years. Whether incorporating home fitness machines or performing various cardiovascular activities, home exercise also suffers from several drawbacks. For example, at home, an individual must be self-motivated and capable of creating a plurality of different workout routines to obtain good results. Moreover, individuals exercising at home do not have access to a skilled personal trainer who can provide custom instructions and motivation to the individuals who are looking to achieve a specific goal.

Additionally, nutrition, healthy eating and a good diet are important factors which are often overlooked by many individuals in both home and gym settings. To this end, it is important that nutritional intake and diet of an exercising individual be conducive to the end result.

Accordingly, it would be beneficial to provide a system and method for creating user-defined workout routines and nutritional menus in an online environment, which can enable a user to experience the benefits of a gym membership in a private setting.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is a method for creating a user-defined workout routine and one or more nutritional choices in an online environment. In certain embodiments, the method may include receiving, from a user, data associated with one or more user personal metrics. The one or more user personal metrics may include weight, height, age, gender, waist length, fitness level, cholesterol level, blood pressure, body mass index, and the like. The method may further include providing the user with a plurality of workout video segments based on the user personal metrics. The plurality of workout video segments may be provided as thumbnails to allow the user to preview exercises in each workout video segment. The method may further include receiving, from the user, a video selection. The video selection may include one or more workout video segments selected from the plurality of workout video segments and automatically combining the one or more workout video segments into a customized workout video. The customized workout video may be provided to the user and include one or more exercises performed by one or more trainers.

Additionally, the method may include compiling, based on the user personal metrics, the one or more nutritional choices and providing them to the user. The one or more nutritional choices may include a plurality of meals selected to meet a predefined nutritional goal of the user. The one or more nutritional choices may include one or more of the following: a daily nutritional menu, a weekly nutritional menu, and a monthly nutritional menu. The one or more nutritional choices may be associated with the video selection of the user.

In certain embodiments, the method may further include incorporating one or more of the following additional features into the customized workout video: a warm up session, a recovery session, a stretching session, and a meditation session. In certain embodiments, the method may further include providing the user with a meal description, a meal recipe, and a shopping list for meal ingredients. In certain embodiments, the method may further include providing the user with a list of restaurants and nutritional details of menu items that conform with the predefined nutritional goal of the user when not eating at home.

In certain embodiments, the method may further include providing the user with a personalized tracker configured to assist the user with managing the workout routine and one or more nutritional choices of the user. In certain embodiments, the method may further include providing the user with one or more means for a direct communication with a personal trainer.

Also provided is a system for creating a user-defined workout routine and one or more nutritional choices in an online environment. In certain embodiments, the system may include a processor and a memory comprising computer-readable instructions for execution by the processor. The processor may be configured to receive, from a user, data associated with one or more user personal metrics and provide the user with a plurality of workout video segments based on the user personal metrics. The processor may be further configured to receive, from the user, a video selection, the video selection including one or more workout video segments selected from the plurality of workout video segments, and automatically combine the one or more workout video segments into a customized workout video. The processor may be further configured to provide the user with the customized workout video, the customized workout video including one or more exercises performed by one or more trainers. Additionally, the processor may be configured to compile the one or more nutritional choices based on the user personal metrics and provide the one or more nutritional choices to the user.

Provided also is a machine-readable medium including instructions, which when implemented by one or more processors, perform the following example operations. In one example operation, data associated with one or more user personal metrics may be received from a user. In a further example operation, the user may be provided with a plurality of workout video segments based on the user personal metrics. In another example operation, a video selection may be received from the user. The video selection may include one or more workout video segments selected from the plurality of workout video segments. In yet another operation, the one or more workout video segments may be automatically combined into a customized workout video. In yet another operation, the user may be provided with the customized workout video. The customized workout video may include one or more exercises performed by one or more trainers. In further operation, the one or more nutritional choices may be compiled based on the user personal metrics and provided to the user. The one or more nutritional choices may be associated with the video selection of the user and may include a plurality of meals selected to meet a predefined nutritional goal of the user.

The following detailed description together with the accompanying drawings will provide a better understanding of the nature and advantages of the present invention.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, numerous specific details are set forth in order to provide a thorough understanding of the presented concepts. It should be understood, however, that the presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In accordance with various embodiments and the corresponding disclosure thereof, computer-implemented methods and systems for creating a user-defined workout routine and one or more nutritional choices in an online environment are provided. The disclosed methods and systems provide a unique way to experience a live interactive workout with a professional trainer in the privacy of their own home.

The methods disclosed herein may be implemented in various types of electronic user devices including tablet PCs, laptops, mobile and smart phones, computers, and any other electronic devices configured to display digital content and interact with remote servers via a network such as the Internet. In some example embodiments, the user devices may merely embed a web browser allowing users to browse Internet websites and virtually interact with a remote system for creating a user-defined workout routine and nutritional menu in an online environment.

The term "personal trainer", as used herein, may include anyone with skill and knowledge in the area(s) of fitness, exercise, nutrition, diet, dietary supplements, weight loss and/or healthy eating education.

The system and method for creating a user-defined workout routine and one or more nutritional choices in an online environment may be implemented in any number of different manners, for example, as a web-based remote application. In certain embodiments, the system and method described herein may be simultaneously implemented via different websites that are directed towards individual markets and/or geographic locales.

According to the present disclosure, the system may provide means for allowing individuals to engage one or more personal trainers in an online setting. Likewise, method steps may include functionality for presenting users with daily recommended workouts, meals for healthy living, and the ability to allow users to create custom videos featuring personal trainers who will provide live-action exercises to specific target areas of the body as specified by the user.

Figure 1:
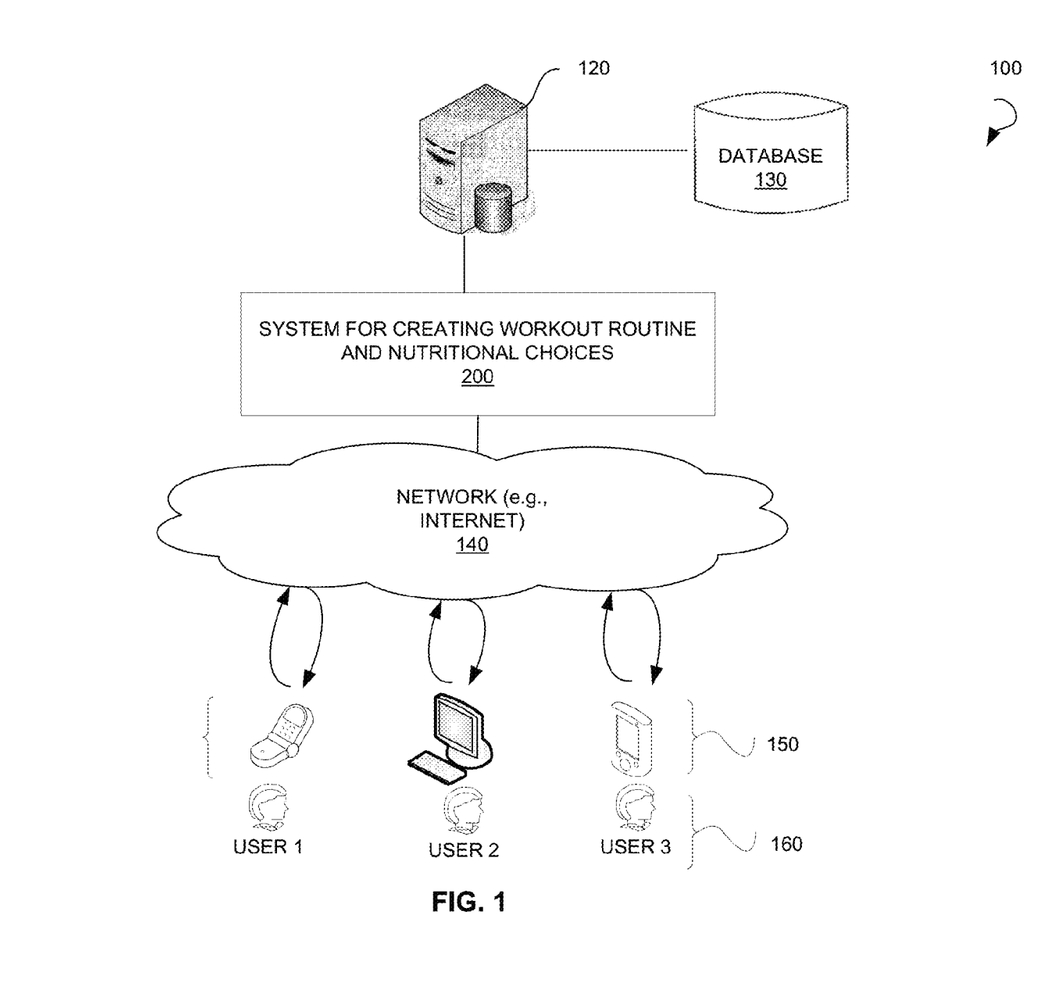
FIG. 1 shows a block diagram illustrating a sample environment within which methods and systems for creating a user-defined workout routine and one or more nutritional choices in an online environment may be implemented, in accordance with an example embodiment.

Referring now to the drawings, FIG. 1 is a block diagram showing an environment within which methods and systems for creating a user-defined workout routine and one or more nutritional choices may be implemented, according to an example embodiment. FIG. 1 shows an architecture 100 which may include a network 140, client devices 150, a plurality of users 160, a system for creating a user-defined workout routine and one or more nutritional choices 200, a system database 130, and a server 120. The plurality of users 160 may communicate over the network 140 with the system for creating a user-defined workout routine and one or more nutritional choices 200 having one or more connected databases 130.

The network 140 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 140 may include a network of data processing nodes that are interconnected for the purpose of data communication.

The client devices 150, in some example embodiments, may include a Graphical User Interface (GUI) for displaying a user system interface. The client devices 150 may include a desktop computer, laptop computer, tablet computer, cell phone, smart phone, gaming device, smart TVs, Roku, or the like. Users, in some example embodiments, include persons interacting with the user system interface via the client devices 150. Users may periodically interact with the system 200 and provide or update various data associated with their fitness, nutrition, and wellness status over time from any location (e.g., home computer and office computer). This information may be retained in a system database 130.

In certain embodiments, the system for creating a user-defined workout routine and one or more nutritional choices 200 may include one or more servers 120, which may be configured to host a website having format and information values stored within the database 130. The website may display a number of different screens for implementing the system for creating a user-defined workout routine and one or more nutritional choices 200 in an online environment.

Figure 2:
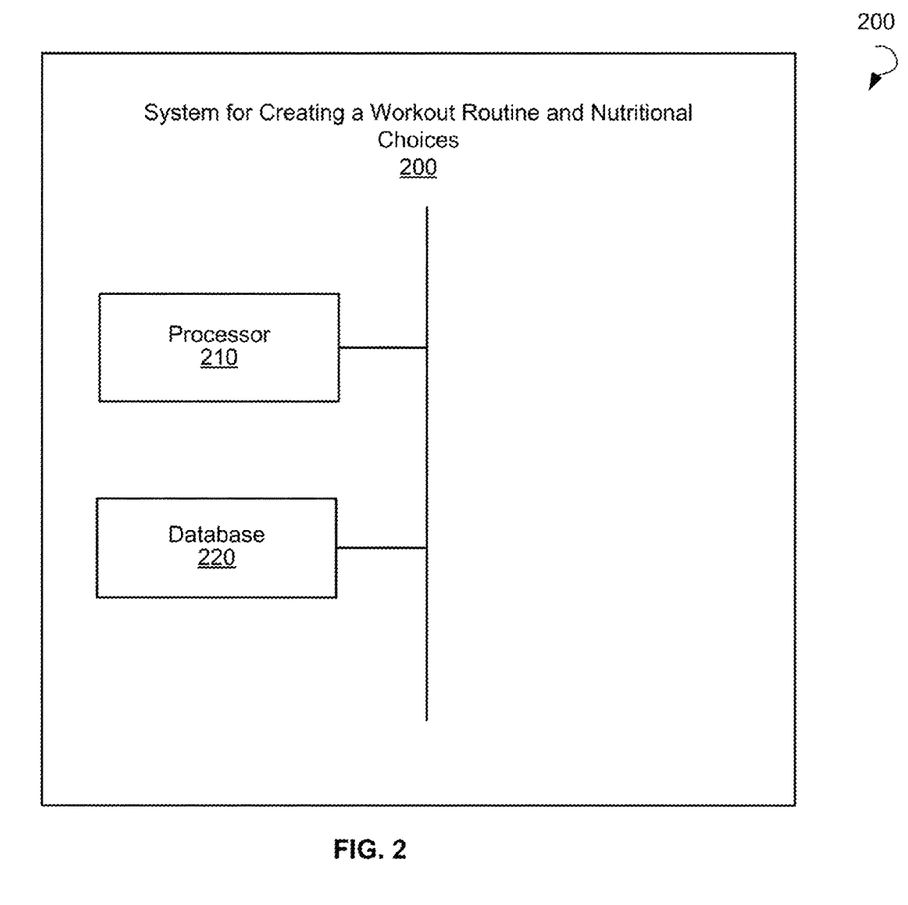
FIG. 2 shows a schematic representation of elements of a system for creating a user-defined workout routine and one or more nutritional choices in an online environment, in accordance with certain embodiments.

FIG. 2 is a schematic representation of components of a system for creating a user-defined workout routine and one or more nutritional choices in an online environment, in accordance with certain embodiments. The sample system may comprise a processor 210. The processor 210 may be configured to receive, from a user, data associated with one or more user personal metrics. The user personal metrics may include weight, height, age, gender, waist length, fitness level, cholesterol level, blood pressure, body mass index, and the like. Additionally, the user may upload a picture or avatar which may be viewable to other site members.

The processor 210 may be further configured to provide the user with a plurality of workout video segments, based on the user personal metrics. The plurality of workout video segments may be presented to the user in a thumbnail manner allowing the user to preview exercises in each workout video segment. In certain embodiments, the user may be provided with one or more recommended workout videos automatically compiled based on the user personal metrics.

The processor 210 may be further configured to automatically combine the one or more workout video segments into a customized workout video and provide the user with the customized workout video. The customized workout video may include one or more exercises performed by one or more personal trainers in an online setting.

The processor 210 may be further configured to compile, based on the user personal metrics, one or more nutritional choices and provide them to the user. The nutritional choices may include a plurality of meals selected to meet a predefined nutritional goal of the user. The nutritional goal may be defined by a user during the registration process or any time during the training. The nutritional goal may be, for example, to loose/gain, to lower high blood pressure, to eat more vegetables, and so forth. The nutritional choices may be associated with the video selection of the user. For example, if the user selects heavy exercises, the system may suggest to the user to consume high-energy meals.

In certain embodiments, the processor 210 may be further configured to provide the user with a meal description, a meal recipe, and a shopping list for meal ingredients. In certain embodiments, the processor 210 may be further configured to provide the user with a list of restaurants and nutritional details of menu items that conform with the predefined nutritional goal of the user when the user is not eating at home.

In certain embodiments, the processor 210 may be further configured to provide the user with a personalized tracker configured to assist the user with managing the workout routine and one or more nutritional choices of the user. The tracker may provide users a daily/weekly/monthly view into their progress and what they need to do to keep on track. It will respond and take feedback from their workouts and meals and provide feedback in the form of recommendations designed to assist in meeting the objectives of the user.

In certain embodiments, the processor 210 may be further configured to provide the user with one or more means for a direct communication with a personal trainer, such as via email, telephone, and online chat sessions.

The system may also comprise a system database 220 to store personal information associated with the user. Preferably, the user information will comprise user name, address, social security number, weight, eating habits, payment details, credit rating, phone number(s), e-mail addresses, personal metrics, lifestyle information, and the like. The user information may be provided by the user upon registration with the system 200 and updated by the user over time. Additionally, the system database 220 may be configured to continuously collect and store wellness, nutrition, and fitness result information associated with the user. The result information may be provided by the user or recorded by the system after the user performs a workout routine or consume a meal.

Figure 3:
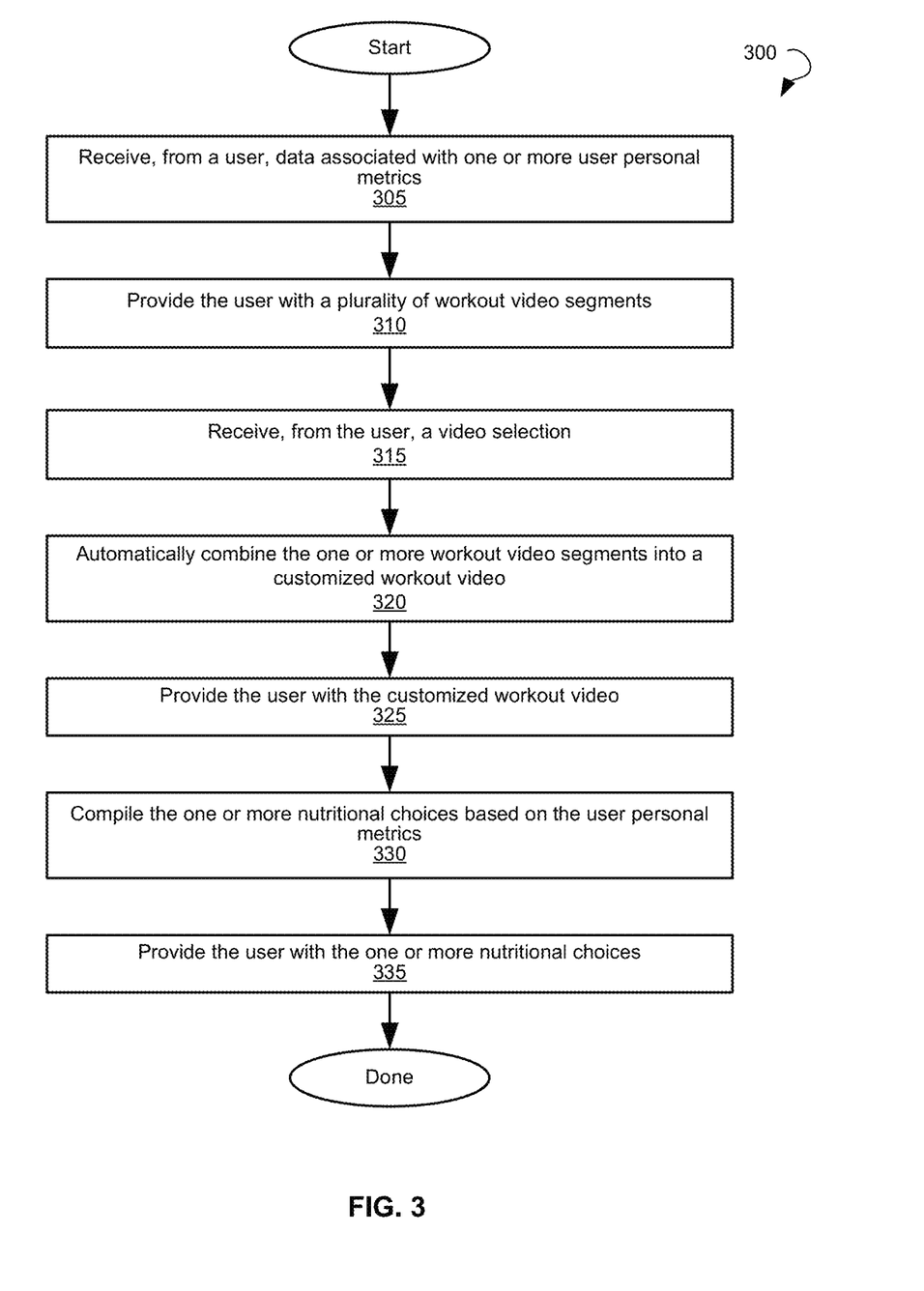
FIG. 3 shows a flow chart illustrating a method for creating a user-defined workout routine and one or more nutritional choices in an online environment, in accordance with an example embodiment.

FIG. 3 shows a flow chart illustrating a method for creating a user-defined workout routine and one or more nutritional choices in an online environment, in accordance with an example embodiment. The method 300 may commence with receiving, from a user, data associated with one or more user personal metrics, at operation 305. In certain embodiments, the system 200 may create user wellness profile based on the personal metrics provided by the user, and may also generate user health plan aimed at improving user's health condition. The system 200 may be configured to retain user profile history, which may be accessed by the user to monitor his or her progress.

At operation 310, the user may be provided with a plurality of workout video segments based on the user wellness profile and user personal metrics. In certain embodiments, the user may be provided with one or more recommended workout videos automatically compiled based on the user personal metrics.

At operation 315, a video selection may be received from the user. The video selection may include one or more workout video segments selected from the plurality of workout video segments. The user may select one or more video segments for processing by a workout builder module.

The method 300 may proceed with automatically combining the one or more workout video segments into a customized workout video at operation 320. The customized workout video may include one or more exercises performed by one or more personal trainers. In certain embodiments, one or more additional features, such as a warm up session, a recovery session, a stretching session, a meditation session, and the like may be incorporated into the customized workout video.

At operation 325, the user may be provided with the customized workout video. At operation 330, the one or more nutritional choices may be compiled based on the user personal metrics, and provided to the user, in operation 335. The one or more nutritional choices may include a plurality of meals selected to meet a predefined nutritional goal of the user. Additionally, the one or more nutritional choices may be associated with the video selection of the user and may include a daily nutritional goal, a weekly nutritional goal, a monthly nutritional goal, and so forth.

FIGS. 4-8 below present exemplary presentation screens, which may be generated by the server 120 and accessed by users 160 on a website and website pages. However, particular system and method steps are not limited to such an arrangement, as those of skill in the art will recognize that any number of different and/or additional system component, method steps and content delivery mechanisms can also be provided without deviating from the scope and spirit of the inventive concepts disclosed herein.

In certain embodiments, the website may include a brief synopsis of information about the website such as, for example, types of exercise and dietary activities available to registered users, success stories, membership costs, and other pertinent information. Additionally, the website may provide options for registering new users or for allowing previously registered members to log in. If the user has not previously registered with the system 200, the user may be taken to a sign up page (not illustrated) where he/she may register to use the system 200. In one embodiment, the user may be required to provide information such as: a username, password, and other basic information necessary to establish a minimum site presence for the user. Of course, the information required to register is not limited to the above, and can include additional information such as payment information and the like.

In certain embodiments, the system 200 may provide a user profile page, which may be accessible to members upon registration or login. The profile page may provide users with options for managing their site presence, membership plans, and the like. Additionally, the users may supply information about themselves such as their personal metrics and upload a picture or avatar which may be viewable to other site members. Although not shown, the profile page may include a link for providing updated payment information such as credit cards and the like. Upon establishing a user profile, members will have access to the rest of the system components in accordance with their membership plan.

Figure 4:
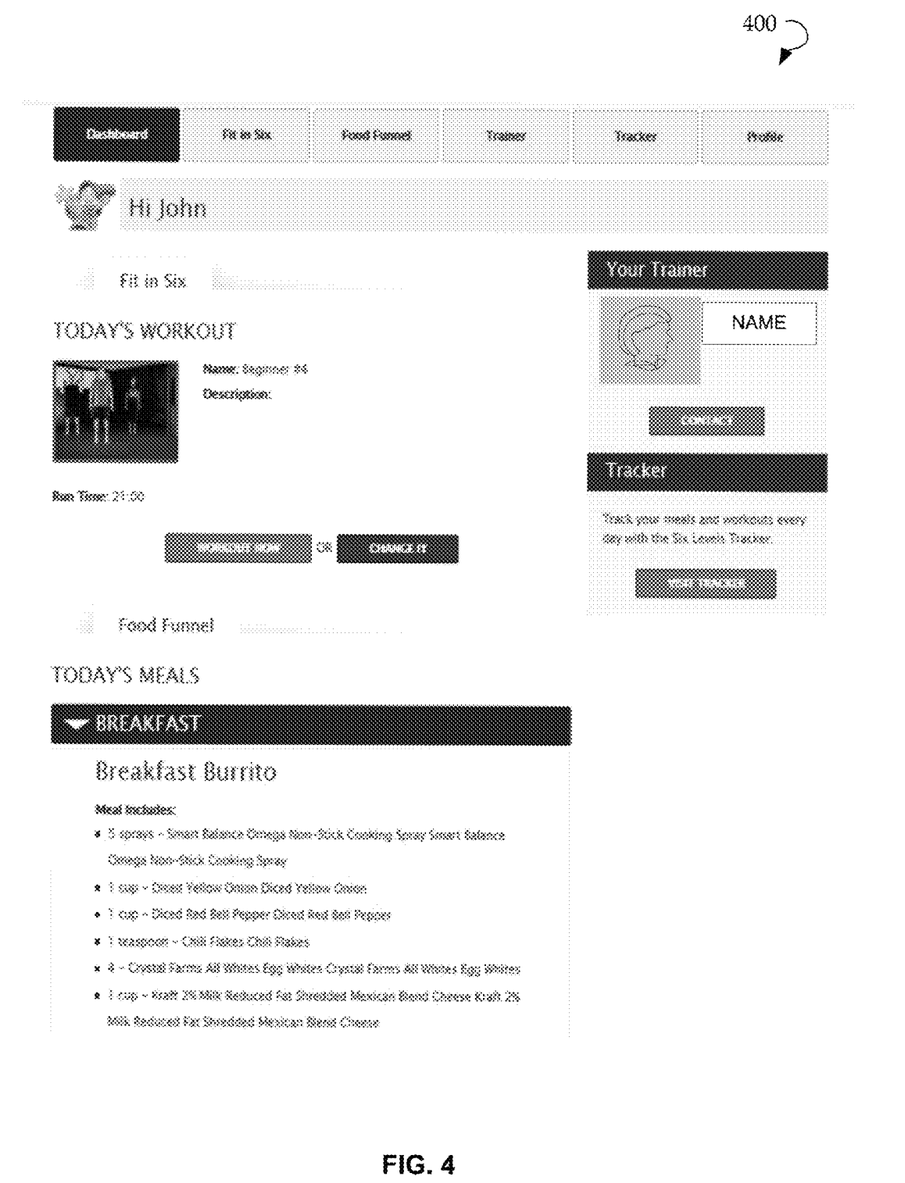
FIG. 4 shows a screen of a user interface showing a user dashboard page, in accordance with an example embodiment.

FIG. 4 shows a sample screen of a user interface showing a user dashboard page 400, in accordance with an example embodiment. The user dashboard page 400 may present the user with daily workouts, daily meal recommendations, and information specific to the user, such as their workout tracker, and a link for contacting their personal trainer. To this end, the user dashboard page 400 may be customized for each user, and may allow easy access for the users to most commonly used system components.

Figure 5:
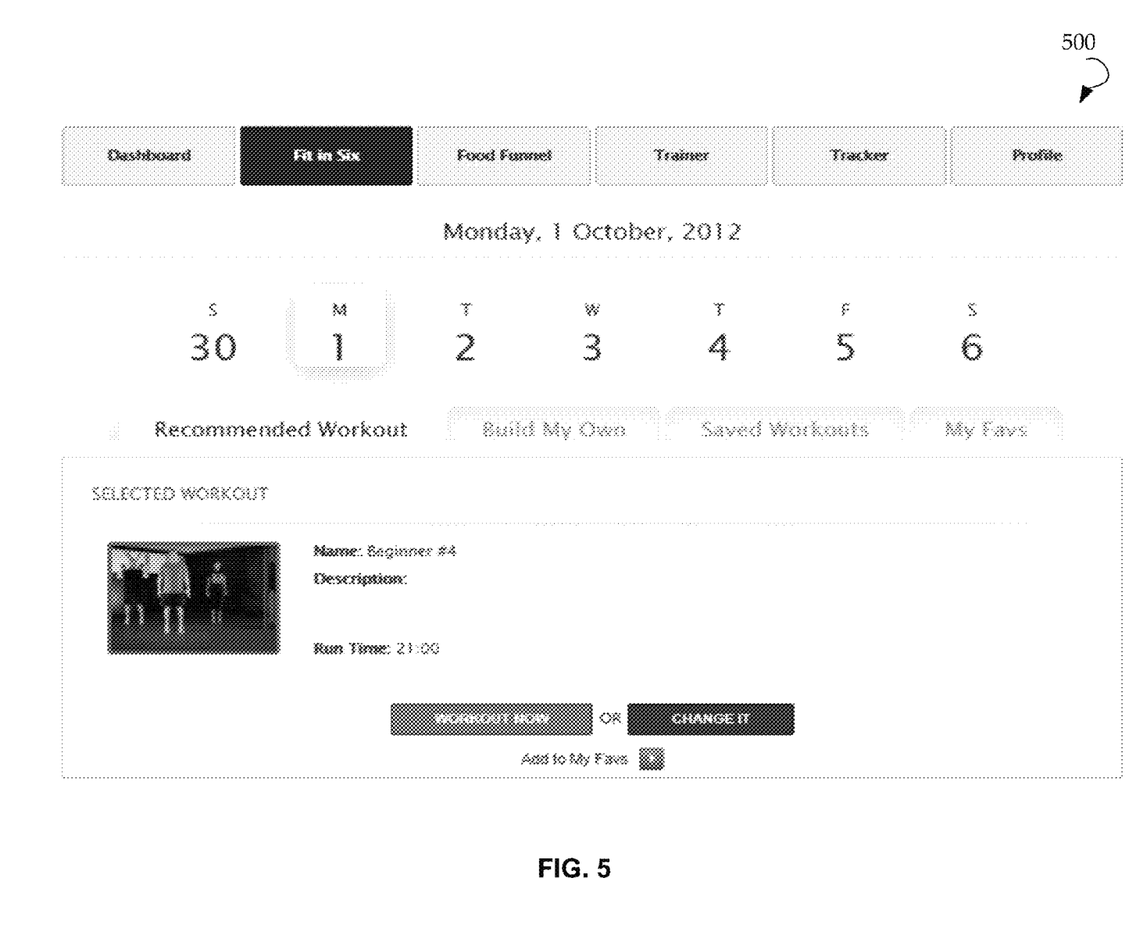
FIG. 5 shows a screen of a user interface showing a user workout page, in accordance with an example embodiment.

FIG. 5 shows a sample screen of a user interface showing a user workout page 500, in accordance with an example embodiment. As shown, the user workout page 500 may include a daily calendar and a plurality of options for allowing a user to choose, store, and create customized workout videos. In one embodiment, the user workout page 500 may be subdivided into four separate areas entitled, for example, "recommended workout", "build my own", "saved workouts", and "favorites". The "recommended workout" section can preferably include a comprehensive and/or full body workout routine that may change each day. Information pertaining to the recommended workout can also be provided, and may include a workout name, a workout description, and the workout duration. If the users like the description of the recommended workout, they can select the recommended workout and a corresponding workout video will open in a new window.

When selected, the workout video will launch a live-action presentation featuring one or more personal trainers targeting the body areas described in the workout description. If a user does not like the recommended workout, he may change it to view a list of other comprehensive workout videos. This section may include a plurality of comprehensive workout videos that can be displayed to the user based on fitness levels, such as beginner, intermediate and advanced, for example. Any number of additional categories and sorting schemes may also be utilized.

Figure 6:
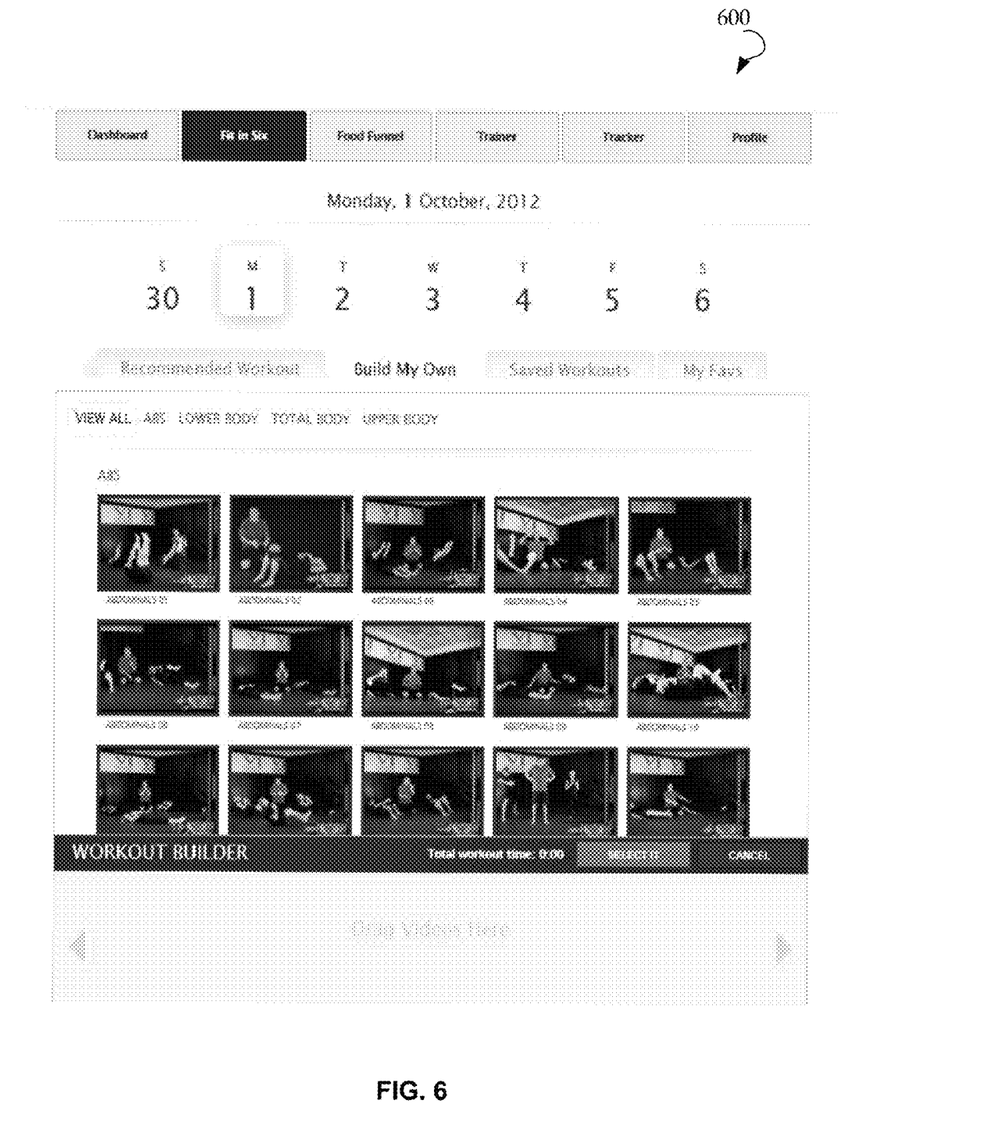
FIG. 6 shows a screen of a user interface showing a user customized workout page, in accordance with an example embodiment.

FIG. 6 shows a sample screen of a user interface showing a user customized workout page 600, in accordance with an example embodiment. The user customized workout page 600 may include a workout builder allowing site users to create a customized workout video featuring live-action presentations of one or more personal trainers targeting user-specified areas. To this end, a plurality of workout video segments, in this example each video segment is approximately six minutes in length, may be presented to a user. Each of these workout video segments may be grouped by particular body portions such as abs, lower body, total body, upper body, and so forth. In one preferred embodiment, each workout video segment may be presented to the user in a thumbnail manner, allowing the user to glimpse an exercise position that the video will use.

In one embodiment, the user may select one or more workout video segments and deposit the same into the workout builder at the bottom of the page by simply dragging and dropping the thumbnail into the workout builder. With each video added, the workout builder may display the total workout time, and provide the order of the selected workout video segments. Once the user has finished selecting workout video segments, the system 200 may prompt the user for additional information such as a video name, and a user supplied description. Once the information has been saved, the system 200 may automatically combine each of the user-specified workout video segments into a single video for viewing.

In certain embodiments, the system 200 may incorporate additional features into each user created video. For example, a warm up section can be included at the beginning of the video, and a series of one-minute recovery sessions can be added after each of the combined video segments. In certain embodiments, users may save their customized workout videos and/or mark recommended workouts for easy retrieval at a later time.

By providing a plurality of live-action, trainer led videos which can be custom built by a user, the above described system and method can combine the motivation and benefits of attending classes at a gym with the privacy of a complete home workout.

Figure 7:
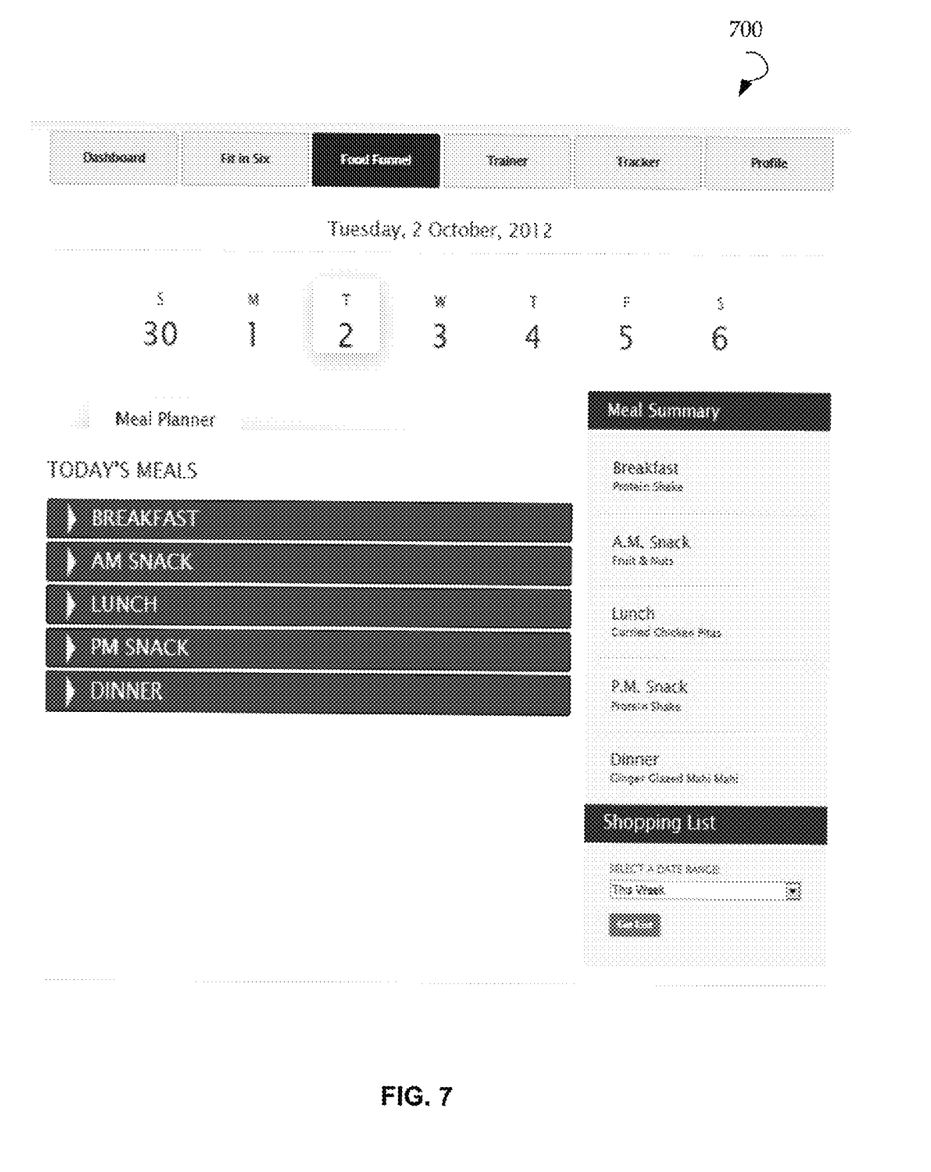
FIG. 7 shows a screen of a user interface showing a nutritional choice page, in accordance with an example embodiment.

FIG. 7 shows a sample screen of a user interface showing a nutritional choice page 700, in accordance with an example embodiment. The nutritional choice page may include a daily calendar and a plurality of recommended meal options for ensuring a healthy diet that conforms to the user's fitness goal. Each recommended meal may provide the user with a complete meal description, including the recipe and a shopping list for the ingredients. Additionally, each recipe may be customized by the user. A new window containing a plurality of substitute choices may be presented for the user to choose from.

In certain embodiments, users may be provided with a list of restaurants and nutritional details of several menu items, in order to provide the users with choices that conform to their fitness goals when not eating at home.

In certain embodiments, a personalized tracker may be provided configured to assist users with managing workout schedules and nutritional goals. The personalized tracker may provide a daily calendar charting both the meals and exercise routines of the user. In one embodiment, information from the personalized tracker may be available to a personal trainer.

Figure 8:
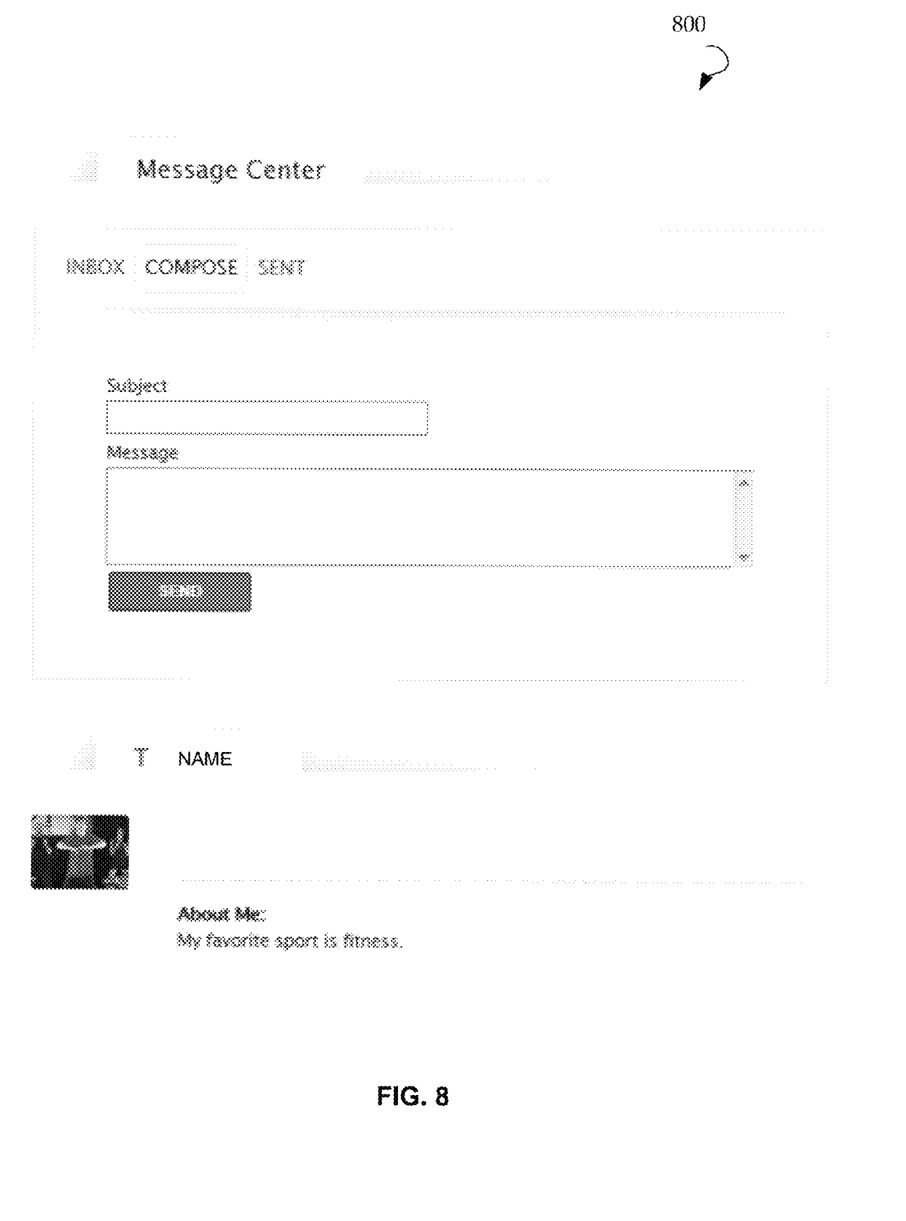
FIG. 8 shows a sample screen of a user interface showing a message center, in accordance with an example embodiment.

FIG. 8 shows a sample screen of a user interface showing a message center page 800, in accordance with an example embodiment. In certain embodiments, depending on a service level selected, users may be able to contact their personal trainer via one or more means for a direct communication, such as email, telephone, and online chat sessions, for example. The system 200 may provide a user with information about a trainer, and a message center where messages can be sent between the trainer and the user. As described above, the trainer can act as a personal coach for providing motivation to the user, and can assist the user with creating customized workout routines to achieve superior results.

In one embodiment, the system 200 may be configured to perform live video chat sessions between a user and a trainer. Such sessions may be used to assist the trainer in creating a customized workout routine for the user and to establish a more personal connection. Additionally, with certain membership levels, the video chat can enable trainers to perform live one-on-one workout sessions with users via two way camera systems, which are commonly known in the art. Such feature may allow users to experience a live interactive workout with a professional trainer in the privacy of their own home.

Accordingly, the above-described system and method for creating a user-defined workout routine and one or more nutritional choices can allow individuals to establish a one-on-one relationship with a personal trainer in an online setting to receive exercise and nutritional guidance. By enabling a user to create customized workout videos featuring live-action exercises performed by trained professionals, the system advantageously combines the benefits of a gym membership with the privacy of a home workout.

Figure 9:
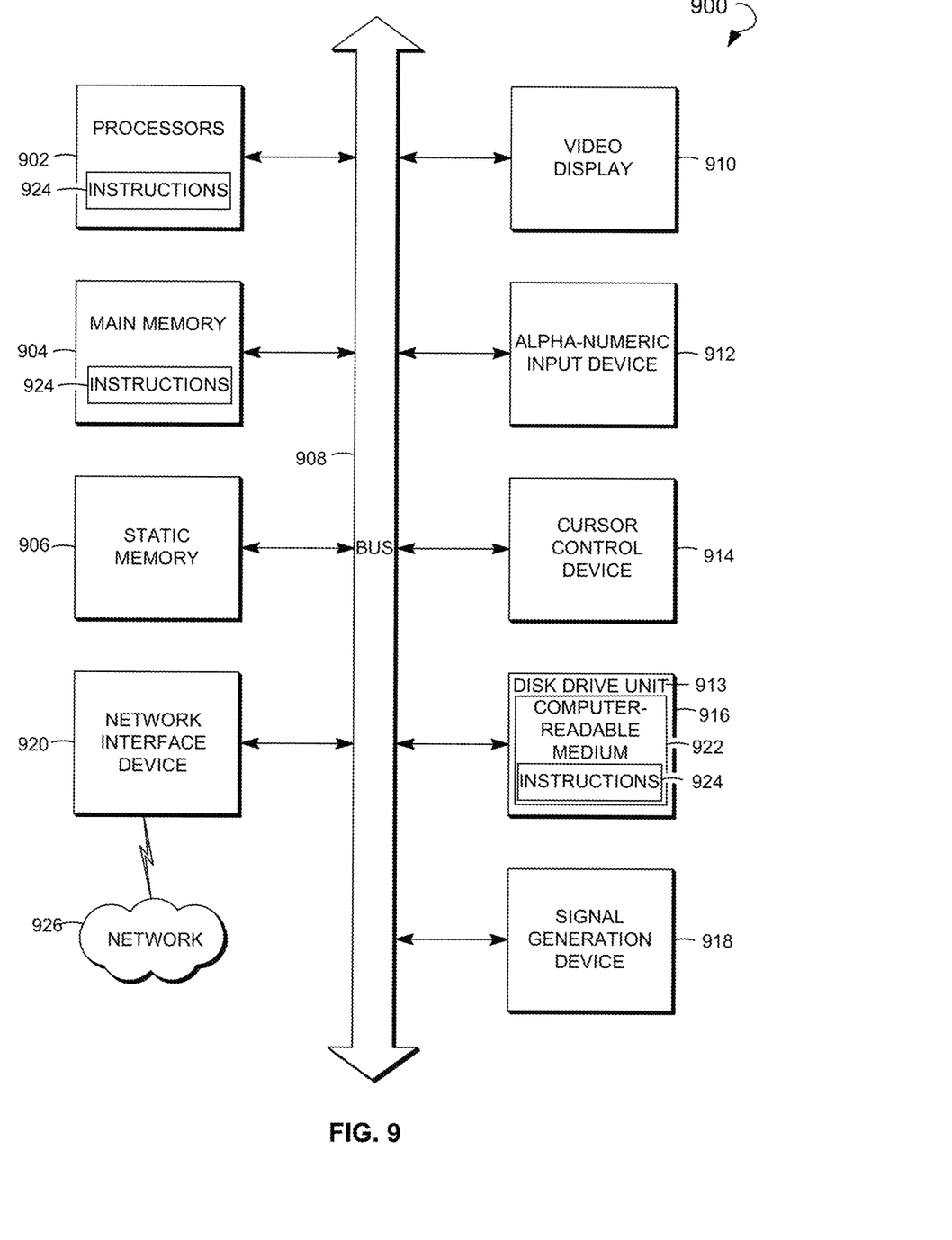
FIG. 9 shows a diagrammatic representation of an example machine in the form of a computer system within which a set of instructions for causing the machine to perform any one or more of the methodologies discussed herein is executed.

FIG. 9 shows a diagrammatic representation of a machine in the example electronic form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, smart TVs, Roku, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 may also include an alphanumeric input device 912 (e.g., a keyboard), a cursor control device 914 (e.g., a mouse), a disk drive unit 913, a signal generation device 918 (e.g., a speaker), and a network interface device 920.

The disk drive unit 916 includes a non-transitory computer-readable medium 922, on which is stored one or more sets of instructions and data structures (e.g., instructions 924) embodying or utilized by any one or more of the methodologies or functions described herein. The instructions 924 may also reside, completely or at least partially, within the main memory 904 and/or within the processors 902 during execution thereof by the computer system 900. The main memory 904 and the processors 902 may also constitute machine-readable media.

The instructions 924 may further be transmitted or received over a network 926 via the network interface device 920 utilizing any one of a number of well-known transfer protocols (e.g., Hyper Text Transfer Protocol (HTTP)).

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computing device 200, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, methods and systems for creating user-defined workout routines and one or more nutritional choices in an online environment have been disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for creating a user-defined workout routine and one or more nutritional choices in an online environment, the method comprising:

storing, at a server system, a plurality of pre-recorded workout video segments, each workout video segment tagged by the server system with an exercise descriptor, a fitness level descriptor, and a duration, the exercise descriptor indicating a purpose of the workout in the workout video segment, the fitness level descriptor indicating a difficulty of the workout in the workout video segment, wherein at least at least some of the plurality of workout video segments have different exercise descriptors, and wherein at least at least some of the plurality of workout video segments have different fitness level descriptors;

receiving, by the server system, from a user device, data associated with one or more user personal metrics;

selecting, by the server system based on the user personal metrics, at least two workout video segments from the plurality of pre-recorded workout video segments;

providing, by the server system, a plurality of workout video segment images to the user device for display by the user device, each workout video segment image of the plurality of workout video segment images representing one of the at least two workout video segments;

providing by the server system, the exercise descriptor and fitness level descriptor for each of the least two workout video segments for display by the user device adjacent the workout video segment image associated with the each of the least two workout video segments;

receiving, by the server system, from the user device, a video selection, wherein the video selection includes at least two workout video segments selected by the user from the plurality of workout video segments;

causing, by the server system, the user device to display an indication of the at least two workout video segments selected by the user, the indication including the workout video segment images associated with the each of the least two workout video segments selected by the user;

determining, by the server system, a total workout time based on a combined duration of the at least two workout video segments and providing the total workout time to the user device for display by the user device in conjunction with the workout video segment images associated with the each of the least two workout video segments selected by the user;

automatically combining, by the server system, the at least two workout video segments into a customized workout video;

providing, by the server system, to the user device for display by the user device the customized workout video, wherein the customized workout video includes one or more exercises performed by one or more trainers;

based on the user personal metrics and the selected at least two workout video segments, compiling, by the server system, the one or more nutritional choices, wherein the one or more nutritional choices include a plurality of meals selected based on the user personal metrics and the selected one or more workout video segments to meet a predefined nutritional goal of the user; and providing, by the server system to the user device for display by the user device, the one or more nutritional choices.

2. The method of claim 1, wherein the one or more user personal metrics include one or more of the following: weight, height, age, gender, waist length, fitness level, cholesterol level, blood pressure, and body mass index.

3. The method of claim 1, wherein the plurality of workout video segment images are provided as thumbnails from the at least two workout video segments to allow the user to preview exercises in each workout video segment.

4. The method of claim 3, wherein receiving the video selection from the user further comprises receiving a selection by the user dragging the thumbnail for the selected workout video segment into a workout builder.

5. The method of claim 1, further comprising providing, by the server system to the user device, one or more recommended workout videos automatically compiled based on the user personal metrics.

6. The method of claim 5, wherein the processor changes the recommended workout videos each day.

7. The method of claim 1, further comprising incorporating one or more of the following additional features into the customized workout video: a warm up session, and a recovery session.

8. The method of claim 1, further comprising providing, by the server system to the user, a personalized tracker configured to assist the user with managing the workout routine and one or more nutritional choices of the user.

9. The method of claim 1, further comprising providing, by the server, one or more means for a direct communication between the user using the user device and a personal trainer.

10. The method of claim 1, wherein the at least two workout video segments selected by the user target at least two different body portions.

11. The method of claim 1, wherein automatically combing the at least two workout video segments into a customized workout video further comprises automatically combining a warm-up or recovery session into the customized workout video.

12. The method of claim 1, wherein the one or more workout video segments are 6 minutes in length.

13. The method of claim 1, wherein the exercise descriptor comprises a body portion descriptor indicating a body area targeted by the workout video segment.

14. A system for creating user-defined workout routine and one or more nutritional choices in an online environment, the system comprising:

a processor;

a memory comprising computer-readable instructions for execution by the processor, wherein the processor is configured to:

store a plurality of pre-recorded workout video segments, each workout video segment tagged by the server system with an exercise descriptor, a fitness level descriptor, and a duration, the exercise descriptor indicating a purpose of the workout in the workout video segment, the fitness level descriptor indicating a difficulty of the workout in the workout video segment, wherein at least at least some of the plurality of workout video segments have different exercise descriptors, and wherein at least at least some of the plurality of workout video segments have different fitness level descriptors;

receive, from a user device, data associated with one or more user personal metrics;

select, based on the user personal metrics, at least two workout video segments from the plurality of pre-recorded workout video segments;

provide a plurality of workout video segment images to the user device for display by the user device, each workout video segment image of the plurality of workout video segment images representing one of the at least two workout video segments;

provide the exercise descriptor and fitness level descriptor for each of the least two workout video segments for display by the user device adjacent the workout video segment image associate with the each of the least two workout video segments;

receive, from the user device, a video selection, wherein the video selection includes at least two workout video segments selected by the user from the plurality of workout video segments;

cause the user device to display an indication of the at least two workout video segments selected by the user, the indication including the workout video segment images associated with the each of the least two workout video segments selected by the user;

determine a total workout time based on a combined duration of the at least two workout video segments and providing the total workout time to the user device for display by the user device in conjunction with the workout video segment images associated with the each of the least two workout video segments selected by the user;

automatically combine the at least two workout video segments into a customized workout video;

provide to the user device for display by the user the customized workout video, wherein the customized workout video includes one or more exercises performed by one or more trainers;

based on the user personal metrics and the selected at least two workout video segments, compile the one or more nutritional choices, wherein the one or more nutritional choices include a plurality of meals selected based on the user personal metrics and the selected at least two workout video segments to meet a predefined nutritional goal of the user; and provide the user device for display by the user device the one or more nutritional choices.

15. The system of claim 14, wherein the one or more user personal metrics include one or more of the following: weight, height, age, gender, waist length, fitness level, cholesterol level, blood pressure, and body mass index.

16. The system of claim 14, wherein the plurality of workout video segment images are provided as thumbnails from the at least two workout video segment to allow the user to preview exercises in each workout video segment.

17. The system of claim 14, wherein the processor is further configured to provide the user device with one or more recommended workout videos automatically compiled based on the user personal metrics.

18. The system of claim 14, wherein the processor is further configured to incorporate one or more of the following additional features into the customized workout video: a warm up session, and a recovery session.

19. The system of claim 14, wherein the processor is further configured to provide the user with a personalized tracker configured to assist the user with managing the workout routine and one or more nutritional choices of the user.

20. The system of claim 14, wherein the processor is further configured to provide one or more means for a direct communication between the user using the user device and a personal trainer.

21. A non-transitory computer-readable storage medium having embodied thereon a program, the program being executable by a processor to perform a method for creating a user-defined workout routine and one or more nutritional choices in an online environment, the method comprising:

storing a plurality of pre-recorded workout video segments, each workout video segment tagged by the server system with an exercise descriptor, a fitness level descriptor, and a duration, the exercise descriptor indicating a purpose of the workout in the workout video segment, the fitness level descriptor indicating a difficulty of the workout in the workout video segment, wherein at least at least some of the plurality of workout video segments have different exercise descriptors, and wherein at least at least some of the plurality of workout video segments have different fitness level descriptors;

receiving, from a user device, data associated with one or more user personal metrics;

selecting, based on the user personal metrics, at least two workout video segments from the plurality of pre-recorded workout video segments;

providing a plurality of workout video segment images to the user device for display by the user device, each workout video segment image of the plurality of workout video segment images representing one of the at least two workout video segments;

providing the exercise descriptor and fitness level descriptor for each of the least two workout video segments for display by the user device adjacent the workout video segment image associate with the each of the least two workout video segments;

receiving, from the user device, a video selection, wherein the video selection includes at least two workout video segments selected by the user from the plurality of workout video segments;

causing the user device to display an indication of the at least two workout video segments selected by the user, the indication including the workout video segment images associated with the each of the least two workout video segments selected by the user;

determining a total workout time based on a combined duration of the at least two workout video segments and providing the total workout time to the user device for display by the user device in conjunction with the workout video segment images associated with the each of the least two workout video segments selected by the user;

automatically combining, by the server system, the at least two workout video segments into a customized workout video;

providing, by the server system, to the user device for display by the user device the customized workout video, wherein the customized workout video includes one or more exercises performed by one or more trainers;

based on the user personal metrics and the selected at least two workout video segments, compiling, by the server system, the one or more nutritional choices, wherein the one or more nutritional choices include a plurality of meals selected based on the user personal metrics and the selected one or more workout video segments to meet a predefined nutritional goal of the user; and providing, by the server system to the user device for display by the user device, the one or more nutritional choices.

22. The computer-readable storage medium of claim 21, wherein the one or more user personal metrics include one or more of the following: weight, height, age, gender, waist length, fitness level, cholesterol level, blood pressure, and body mass index.

23. The computer-readable storage medium of claim 21, wherein the plurality of workout video segment images are provided as thumbnails from the at least two workout video segment to allow the user to preview exercises in each workout video segment.

24. The computer-readable storage medium of claim 21, wherein the method comprises providing the user device with one or more recommended workout videos automatically compiled based on the user personal metrics.

25. The computer-readable storage medium of claim 21, wherein the exercise descriptor comprises a body portion descriptor indicating a body area targeted by the workout video segment.

\* \* \* \* \*

UNITED STATES PATENT AND TRADEMARK OFFICE
CERTIFICATE OF CORRECTION

PATENT NO. : 9,799,230 B2  
APPLICATION NO. : 14/067624  
DATED : October 24, 2017  
INVENTOR(S) : Anne Shrake Page 1 of 1

It is certified that error appears in the above-identified patent and that said Letters Patent is hereby corrected as shown below:

In the Specification

Column 1, Line 8: delete "The applications" and insert --This application--, therefor.

Column 1, Line 9: delete "Applications" and insert --Application--, therefor.

In the Claims

Column 13, Line 2, in Claim 1: delete "at least at least" and insert --at least--, therefor.

Column 13, Line 4, in Claim 1: delete "at least at least" and insert --at least--, therefor.

Column 14, Line 48, in Claim 14: delete "at least at least" and insert --at least--, therefor.

Column 14, Line 50, in Claim 14: delete "at least at least" and insert --at least--, therefor.

Column 16, Line 2, in Claim 21: delete "at least at least" and insert --at least--, therefor.

Column 16, Line 4, in Claim 21: delete "at least at least" and insert --at least--, therefor.

Signed and Sealed this  
Seventeenth Day of April, 2018

Andrei Iancu  
*Director of the United States Patent and Trademark Office*